United States Patent [19]

Duarte

[11] Patent Number: 5,554,344

[45] Date of Patent: Sep. 10, 1996

[54] GAS IONIZATION DEVICE

[76] Inventor: Fernando C. Duarte, 275 Orange Ave., #127A, Chula Vista, Calif. 91911

[21] Appl. No.: 240,876

[22] Filed: May 11, 1994

[51] Int. Cl.$^6$ ..................................... C01B 13/11
[52] U.S. Cl. ................. 422/186.07; 422/186.18; 422/907
[58] Field of Search ............... 422/186.07, 186.18, 422/186, 186.04, 907

[56] References Cited

U.S. PATENT DOCUMENTS

| | | | |
|---|---|---|---|
| 512,265 | 1/1894 | Andreoli | 422/186.07 |
| 788,557 | 5/1905 | Sahlström | 422/186.07 |
| 935,457 | 9/1909 | Bridge | 422/186.07 |
| 1,010,777 | 12/1911 | Leggett | 422/186.07 |
| 1,011,503 | 12/1911 | Shepherd | 422/186.07 |
| 2,575,664 | 11/1951 | James | 204/316 |
| 2,658,868 | 11/1953 | Collison | 204/320 |
| 2,822,327 | 2/1958 | Hammesfahr et al. | 204/176 |
| 2,906,686 | 9/1959 | Trüb | 204/317 |
| 3,309,304 | 3/1967 | Caplan | 204/313 |
| 3,967,131 | 6/1976 | Slipiec et al. | 250/539 |
| 4,062,748 | 12/1977 | Imris | 204/176 |
| 4,159,971 | 7/1979 | Gneupl | 422/186.19 |
| 4,774,062 | 9/1988 | Heinenmann | 422/186.19 |
| 4,981,656 | 1/1991 | Leitzke | 422/186.18 |

*Primary Examiner*—Donald P. Walsh
*Assistant Examiner*—Daniel Jenkins

[57] ABSTRACT

This device is a gas ionization device which can also be referred to as a corona discharge type of ozone generator. The design is tubular comprised of an inner and outer concentric metal electrode and ground plane with a glass dielectric tube disposed between them. Gas is passed between the dielectric and the ground plane for the purpose of producing concentrations of ozone. The electrode as well as the ground plane are designed to permit cooling of the ozone producing chamber. An electro-static field enhancing technique effectively produces a significant greater amount of ozone as a result.

1 Claim, 2 Drawing Sheets

GAS IONIZATION DEVICE

BACKGROUND OF THE INVENTION

1. Field of Invention

This invention is an improvement of a classic corona-discharge-type ozonater, comprised of an inner and an outer electrode, connectable to an electric power-source, with a dielectric-tube concentrically disposed between the electrodes. An ozone chamber is formed between one, or both, of the electrodes and the dielectric tube.

2. Description of the Prior Art

Ozone is an allotrope of oxygen, having the chemical formula $O_3$. Ozone is a very potent oxidant and is, also, the most potent bactericide known. Ozone has been proven to destroy every type of microscopic bacteriological contamination found in water. It is, also, effective against water borne virus, spores and cysts. Ozone has been used in Europe for potable-water disinfection since 1904.

Ozone gas has a unique combination of bactericidal and oxidizing properties, that are now best suited to a large variety of commercial and domestic applications but mostly to water treatment.

Ozone does not create toxic residual by products, e.g. dioxins, etc. Ozone is a radical-oxygen-element and is harmlessly reabsorbed into the atmosphere, directly and/or indirectly after the gas has been exposed to contaminated-matter. Ozone is reabsorbed into the oxygen-chain as an oxygen-molecule, without disturbing the "accepting" oxygen atom. Thus, ozone offers society, and industry, a safe, non-toxic medium, with none of the negatives associated with other solutions.

The known uses of ozone, in the United States, have been growing for the last several years. An impediment to this growth, however, has been the ozone generators themselves. They have, historically, been large, expensive, delicate devices, which has limited their commercial use.

The need today for a line of small, high-output generators (devices that produce ozone from air or oxygen) which are rugged, and inexpensive is unquestioned. As a result, the present and potential uses, for these generators are now enormous and broad based in scope.

There are only two commercially significant methods for producing ozone gas. The two methods are: ultra-violet (UV) radiation, or silent-corona-discharge (CD).

The corona-discharge method is the basis for the majority of large commercial generators. The generation of ozone with the corona-discharge method can produce large amounts of heat. However, in many designs this has caused the device to be inefficient or short lived.

Relevant Prior Art

U.S. Pat. No. 4,159,971 issued to Gneupl, Jul. 3, 1979, shapes the electrode to create a gas-flow-path in his corona-discharge chamber. The shaping that he uses is described as "helically-shaped grooving," extending in the axial-direction of the electrode. The problem with this design is that, by increasing the resident-time that the gas is in contact with the electrode, excess amounts of heat are generated. Heat causes the ozone to dissociate and revert to oxygen more quickly, reducing its effective, useful life, and increasing the cost of ozone-treatment Gneupl does not deal with the enhancing of the electrical field or related advantages.

U.S. Pat. No. 4,774,062 issued to Heinemann, Sep. 27, 1988, discloses substantially as claimed in the described invention. However, Heinemann does not disclose a plurality of peaks on the inner surface of the outer electrode.

Andreoli, Patent #0,512,265, dated Jan. 9, 1894, discloses a plurality of peaks on an electrode surface, for the purpose of increasing ozone production, with ho mention of the side effects; e.g., less voltage requirements, less transformer and reactor-chamber-heat, with the same or higher production. The described invention is not just the discovery of more ozone as a result of a peaked electrode but an opportunity to optimize the output of the entire corona-discharge-chamber, the voltage and power requirements, the ozone output and the heat generated as a result.

U.S. Pat. No. 4,981,656 issued to Leitzke, Jan. 1, 1991, shapes the inner- electrode only by using a hexagon rod or tube. This design does not create individual peaks since this is not teaching a method of enhancement of the electrostatic field. Leitzke failed to recognize the value of enhancing the electrostatic-field or the resulting effect on the various manipulatable elements of ozone-production.

In order to advance beyond the teachings of Gneupl, Heinemann, Andreoli, and Leitzke It was necessary to pursue the basic premise of the shaped-electrode, further to optimize the total performance of all the various components of; pre-production, production and applications of ozone.

In order to better dispose of and/or deal with the heat produced by the corona-discharge, the described device includes a number of innovative cooling methods, of which, the enhancement of electrostatic-field is a part. Both Leitzke and Andreoli describe "peaks on the inner-electrode that produce more ozone". However, peaks also produce greater and unacceptable, amounts of destructive heat. Yet even more ozone and heat are produced if both electrodes are peaked with calculated shape and size facing one another. Neither Lietzke or Crneupl or Andreoli explained or obviously investigated, the advantages of the enhanced field, which provide the means to manipulate the affected elements of ozone production. The heat, investigated and understood, would have allowed other inventors to discover that: The number and shape of the peaks can allow one to manipulate the volume of ozone output, as well as the destructive heat, which are directly related. The more and the sharper the spikes, the more ozone. The higher frequency and controlled-resonance, together with the voltage volume and now, an enhanced field, are all manipulatable. Each element provides an important ingredient in finding an optimum output of ozone. Neither Leitzke, Androli, Gneupl nor Heinemann teach the importance of including, in one design, the ability to manipulate the main elements of ozone production. The enhancement of an electrostatic field is contrary to normal electrical procedure. However, in the production of ozone it is definitely an asset. However, this only holds true if it can be manipulated, as it relates to the other elements required in the production of ozone. As field intensity is increased, ozone production is increased and so is the temperature of the generator. Therefore, each component of the ozone-generating- system is affected. Most ozone generators (gas ionization devices) are cooled by one means or another. Most designs use air or water, passing by the outside of the ground plane, which is usually a smooth tube. The amount of cooling that can be achieved using this method is minimal. The corona-discharge-chamber is best cooled with a pre cooled feed-gas, being directed through the corona-discharge-chamber, enhancing ozone production and increasing the service life of the device.

MARKETS

The number of possible uses for a small, inexpensive and rugged ozone generator are truly immense. These markets are characterized below and which would need and use the improved ozone-generator depicted in this patent application. I belive these markets to be world wide in scope.

MEDICAL: Ozone as an instrument sterilizer.

OZONE AS A PRESERVATIVE; of fruits and vegetables.

OZONE IN AGRICULTURAL IRRIGATION SYSTEMS

OZONE IN SMALL POTABLE-WATER PLANTS

OZONE IN GRAYWATER TREATMENT

OZONE IN OXIDIZING HEAVY METALS

SUMMARY

The gas-ionization device described provides increased production of processed-gas per square foot of physical size, thereby reducing the cost of manufacture and ozone-output. An inexpensive, high output gas ionization device, when used as an ozone generator, will provide an alternative to chemical- treatment for sanitation and bacteria fighting. Ozone is already being used in water treatment and pollution-control. This improved device will have greatly reduced costs of manufacturing which will improve the economics for the end users. The improvements in cooling that have been designed into this gas-ionization device will increase the yield and increase it's dependability and service life. The ability to easily disassemble and repair this device, if needed, will help keep it's operating cost to a minimum. Still further objects and advantages will become apparent from a consideration of the ensuing description and drawing.

DESCRIPTION OF PREFERRED EMBODIMENT

Figure 1:
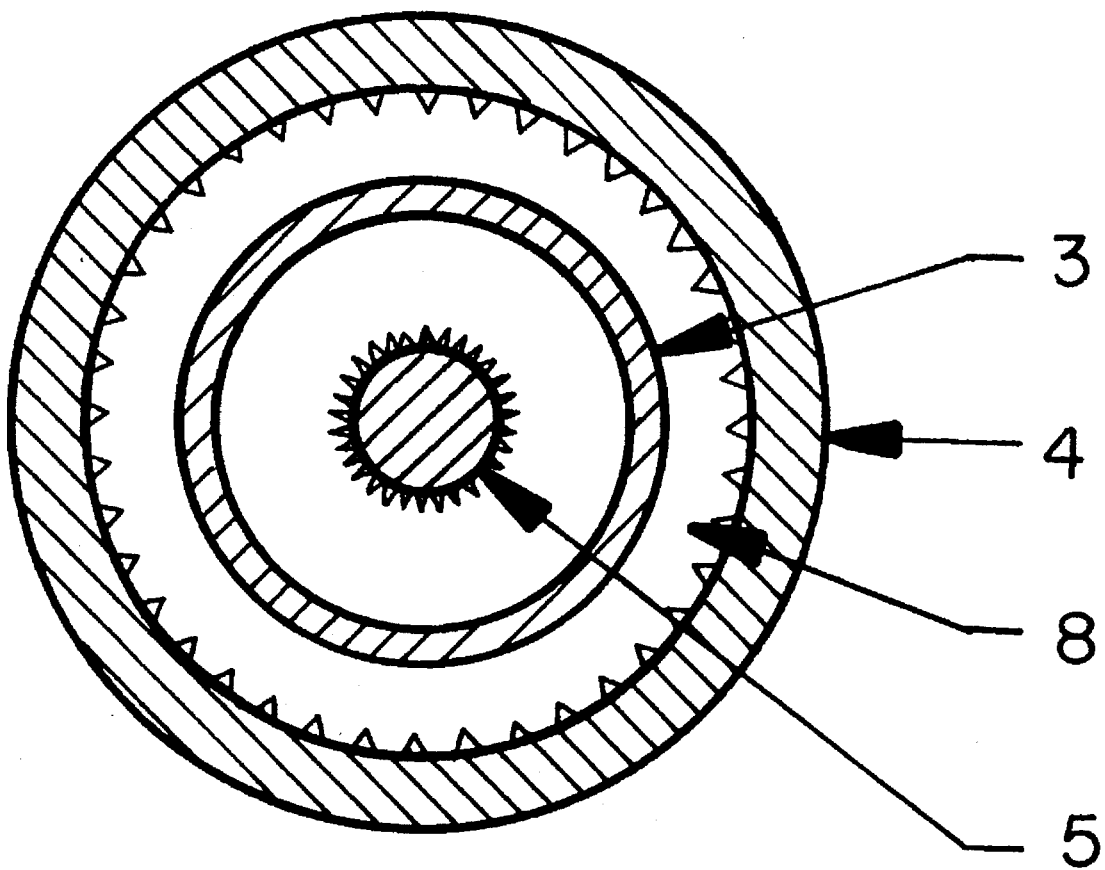
FIG. 1 is an end view of the gas ionization device #5 is the inner electrode tube with a plurality of peaks or spikes etched or machined on its outer surface, #3 is the dielectric tube designed to prevent the electrostatic charge from creating an arc in the gas path of the ionization device; #4 is the outer electrode tube, with individual points or spikes, machined into the inner surface.
Figure 2:
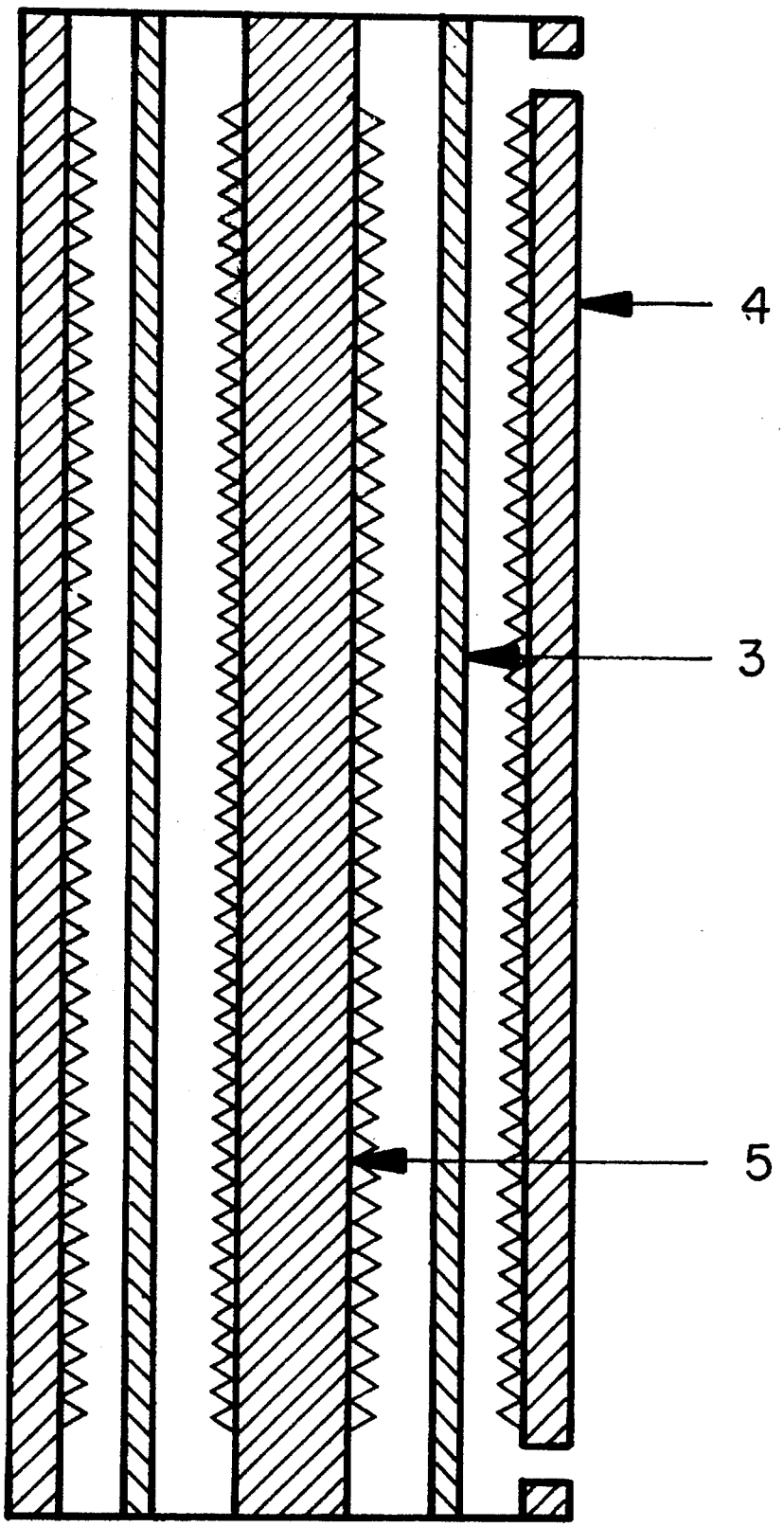
FIG. 2 is a cross sectional, cut away view of the gas ionization device; #5 is the inner, electrode tube, with a plurality of peaks or spikes, etched or machined on its outer surface, as shown by the cross hatch design; #3 is a cut-away of the dielectric tube; #4 is a cut away of the outer electrode, also showing the inner surface having a plurality of peaks or spikes etched or machined on the inner surfaces and shown by the cross hatch design.

The present invention, a classic corona discharge ozonizer, is comprised of an inner electrode and an outer electrode, connectable to an electric power source with a dielectric tube concentrically disposed between the electrodes. An ozone chamber is formed between one or both of the electrodes and the dielectric tube. This defines a path where oxygen is directed around and through the ozone producing chamber.

The outer surface of the inner electrode and the inner surface of the outer electrode is etched or knurled with spikes directly into the body of the said electrode, etched with multi spiral spiked patterns, extending the full length of the ozone producing chamber.

An equal number of spirals are etched in opposite directions extending the full length of the ozone producing chamber forming the sharp spiked peaks. This embodiment will insure a calculated enhancement and disturbance of the electro static field. The spikes will provide a greater surface area and with the spiral, provide an assurance that ozone will be produced over a greater area of the electrode, by directing the feed-gas in such a manner to cover the entire electrode surface.

The purpose of the improved embodiment is, as described above in the treatment of the electrodes. The described enhancement and disturbance, of the electrostatic field produces, in the process, additional amounts of ozone and as a result, additional amounts of heat. This invention allows the option of reducing the voltage by half, producing less heat and more ozone, than before the enhancement of the field. The results are: Less dielectric and transformer stress, as well as less destructive heat, allowing less decomposition of ozone.

Because of the improved embodiment, the manipulation of the various ozone producing elements can allow further improved results by improving the cooling method. Therefore, allowing even higher voltage and an even more active electrostatic field.

What is claimed as new and desired to be secured by Letters Patent of the United States:

1. Gas-ozonator device comprising tubular inner and outer electrodes with a dielectric tube concentrically disposed between them; said electrodes, when separated by the dielectric, create a channel where oxygen is directed through the ozonation chamber; said electrodes are powered by an outside electric source, wherein the embodiment comprises a means of enhancing the electro static field created by the electrodes by etching the exterior of the inner electrode and the interior surface of the outer electrode creating, by calculated design a shaped, sized pattern of the etched spikes.

* * * * *